(12) United States Patent
Wang et al.

(10) Patent No.: US 9,150,197 B2
(45) Date of Patent: Oct. 6, 2015

(54) WIPER BLADE AND METHOD FOR MANUFACTURING THE SAME

(75) Inventors: Yuhua Wang, Beijing (CN); Lun Chai, Hong Kong (CN)

(73) Assignee: Winplus Company Limited, Hong Kong (CN)

( * ) Notice: Subject to any disclaimer, the term of this patent is extended or adjusted under 35 U.S.C. 154(b) by 233 days.

(21) Appl. No.: 13/700,810

(22) PCT Filed: Feb. 6, 2012

(86) PCT No.: PCT/CN2012/070895
§ 371 (c)(1),
(2), (4) Date: Nov. 29, 2012

(87) PCT Pub. No.: WO2012/155542
PCT Pub. Date: Nov. 22, 2012

(65) Prior Publication Data
US 2013/0067679 A1    Mar. 21, 2013

(30) Foreign Application Priority Data

May 19, 2011    (CN) .......................... 2011 1 0129549
Jun. 13, 2011    (CN) .......................... 2011 2 0195608

(51) Int. Cl.
*B60S 1/38* (2006.01)
*B60S 1/32* (2006.01)
*B23P 15/00* (2006.01)

(52) U.S. Cl.
CPC . *B60S 1/32* (2013.01); *B23P 15/00* (2013.01); *B60S 1/38* (2013.01); *B60S 1/3801* (2013.01); *B60S 1/3856* (2013.01); *B60S 2001/382* (2013.01); *B60S 2001/3815* (2013.01)

(58) Field of Classification Search
CPC ............ B60S 1/3801; B60S 1/32; B60S 1/38; B60S 2001/3812; B60S 2001/3813; B60S 2001/3815; B23P 15/00
USPC .............................. 15/250.43, 250.44, 250.46
See application file for complete search history.

(56) References Cited

U.S. PATENT DOCUMENTS 3,192,551 A      7/1965  Appeal
5,485,650 A *    1/1996  Swanepoel ................ 15/250.43
6,266,843 B1 *   7/2001  Doman et al. ........... 15/250.201

(Continued)

FOREIGN PATENT DOCUMENTS

CN      201116096 Y      9/2008
CN      201154693 Y      11/2008
CN      201484362 U      5/2010

(Continued)

*Primary Examiner* — Gary Graham
(74) *Attorney, Agent, or Firm* — The Webb Law Firm

(57) ABSTRACT

The present invention discloses a wiper blade, comprising a frame type long strip skeleton, a connector to be connected to a wiper arm of an automobile and a rubber strip. The skeleton includes one elastic main beam. The body of the main beam has a curved locus, continuous concave downward curve, both end portions of the main beam register with the curved locus and a middle portion of the main beam registers with or deviates from the curved locus. The skeleton includes one or two elastic sub beams, located below and approximately parallel to the main beam which supports the rubber strip. Between the main beam and the sub beams is a means to constitute various frame structures or to adjust a distance between them so that the pressure applied along the entire length of the wiper blade to a windshield can be distributed evenly as far as possible.

15 Claims, 9 Drawing Sheets

(56) References Cited

U.S. PATENT DOCUMENTS

| | | |
|---|---|---|
| 6,301,742 B1 | 10/2001 | Kota |
| 6,973,698 B1 | 12/2005 | Kotlarski |
| 2004/0181894 A1* | 9/2004 | Lee et al. ................ 15/250.201 |
| 2006/0282972 A1* | 12/2006 | Huang .................... 15/250.201 |

FOREIGN PATENT DOCUMENTS

| | | | |
|---|---|---|---|
| CN | 202106937 U | | 1/2012 |
| DE | 3600308 A1 | | 6/1986 |
| DE | 3600308 A1 | * | 6/1986 |
| DE | 102008010540 A1 | * | 6/2009 |

* cited by examiner

B'-B'

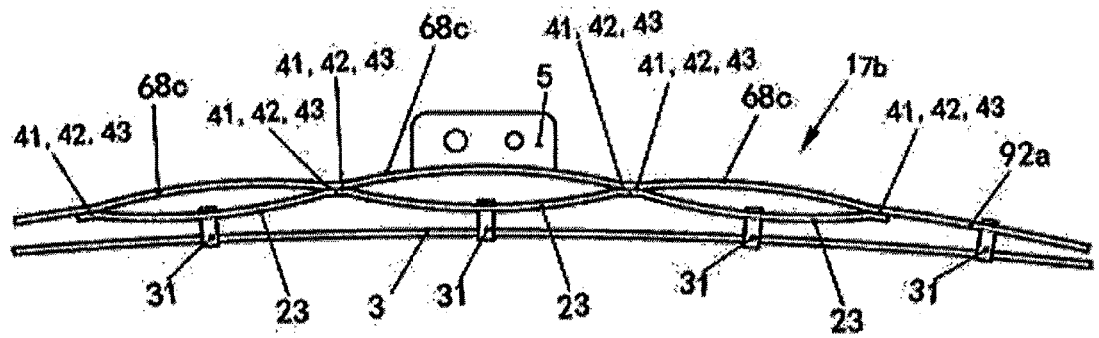
FIG. 8B
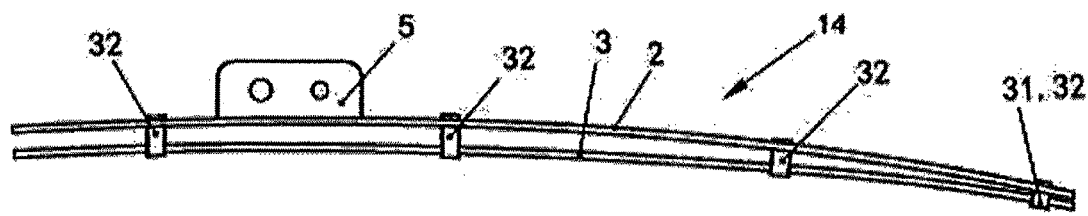
FIG. 9
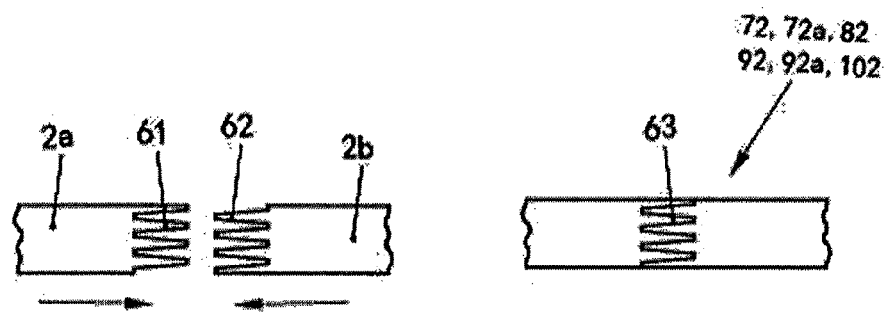
FIG. 10A
FIG. 10B

WIPER BLADE AND METHOD FOR MANUFACTURING THE SAME

FIELD OF THE INVENTION

The present invention relates to a wiper blade and a method for manufacturing the wiper blade. The wiper blade is adaptable to be connected to a wiper arm of an automobile to receive power from it and take a reciprocating scrub on a surface of a windshield glass while moving in an arched locus so that rainwater on the glass is wiped off and good driving sight can be guaranteed.

BACKGROUND OF THE INVENTION

Main requirements for an automobile wiper blade are shown in FIG. 1. A sector in FIG. 1 denotes a wiping region over which the wiper blade sweeps on a windshield glass. In the wiping region, a main visual region indicated by a symbol V is a region a driver is desired farthest to view clearly, and two side visual regions indicated by a symbol V' are regions the viewing requirement for which is lower. When wiping is performed, a surface of the glass over which the wiper blade has swept should be fully wetted by water and a water film good in perspectivity is formed thereon. There should not be a dry region like a painted face unwetted by water. The water film need to be very thin and rainwater should not be accumulated into drips and flows down like tears. Also, water lines consistent with the arched locus in which the wiper blade sweeps should not arise. In regard to evaluation for wiping effect of the wiper blade, it is superior that the water line does not appear in both the V region and the V' regions; it is superior secondly that the water line appears slightly only in the V' regions; and it is inferior that there are more water lines.

In order to attain a high quality wiper blade, it has been found that better wiping effect can be achieved if pressure applied to the windshield glass along an entire length of the wiper blade is distributed evenly. In FIGS. 2A and 2B, a horizontal coordinate denotes a position in the length of the wiper blade wherein 0 is a center of the wiper blade and both ends of the wiper blade are located on left and right sides of the center, and a vertical coordinate denotes linear pressure P (represented by N/m or N/cm), i.e. the force due to pressure received by the glass over a unit length of the wiper blade, applied to the surface of the glass by the wiper blade. Compared with a curve C-2 in FIG. 2B, a curve C-1 in FIG. 2A shows that the linear pressure applied by the wiper blade is distributed more evenly and that better wiping effect can be obtained actually.

A wiper arm is connected to a connector provided on a central portion of the wiper blade only on an end thereof, that is, force is applied to the wiper blade only at the connection point. It is difficult to evenly distribute the force applied at the one point to the windshield glass via a rubber strip having a length of 40~70 cm through a long strip beam or skeleton. The present invention achieves satisfactory effect by employing a specific structure of the wiper blade.

SUMMARY OF THE INVENTION

The present invention provides a wiper blade comprising:
a frame type long strip skeleton for supporting the wiper blade;
a connector which is provided on a middle portion of the long strip skeleton so as to be connected to a wiper arm of an automobile; and
a rubber strip supported or hung by the long strip skeleton,
wherein the long strip skeleton is in an arched shape and has a bending elasticity,
in use, a concave surface of the wiper blade is pressed toward a windshield glass of the automobile,
since the wiper arm applies pressure downward, the rubber strip comes into contact with the windshield glass, and
due to reaction force of the windshield glass, the wiper blade is changed in its curvature and the rubber strip comes into contact over its entire length with the windshield glass so that rainwater on the glass can be wiped off,
characterized in that
the long strip skeleton includes one elastic main beam and one or two elastic sub beams which are located below the main beam and are approximately parallel to the main beam,
in a free state, a body of the main beam has a curved locus in which a specific smoothly continuous curve is concave downward, both end portions of the main beam register with said curved locus and a middle portion of the main beam registers with said curved locus or deviates from said curved locus,
a plurality of hanging hooks which are provided to the main beam or a lower attached piece of the main beam connect the sub beams to the main beam to form a specific frame structure of the long strip skeleton, and
in the long strip skeleton, the rubber strip is supported or hung by the sub beams,
wherein the specific frame structure of the long strip skeleton may also be additionally selected from the following structures in which (1) one to five lower attached pieces having a bending elasticity are provided below the middle portion of the main beam, and the lower attached pieces are straight or concave upward;

(2) a spacing groove is provided above a groove for receiving the sub beams in each leg of the hanging hooks, and the spacing groove has different sizes so that a distance between the main beam and the sub beams in the middle portion of the long strip skeleton is different from that in both end portions of the long strip skeleton;

(3) notches for adjusting bending property of the main beam are provided on both sides of the main beam;

(4) the middle portion of the main beam is fabricated into one to five deformed segments which are integrated with the main beam but deviate from the curved locus therein of the main beam, the deformed segments are concave upward, and an upper attached piece which is straight or concave downward or concave upward may be provided above each of the deformed segments;

(5) the middle portion of the main beam is fabricated into one to five deformed segments which are integrated with the main beam but deviate from the curved locus therein of the main beam, the deformed segments are substantially straight, and an upper attached piece which is straight or concave downward may be provided above each of the deformed segments or a lower attached piece which is straight or concave upward may be provided below each of the deformed segments; and (6) the middle portion of the main beam is fabricated into one to five deformed segments which are integrated with the main beam but deviate from the curved locus therein of the main beam, each of the deformed segments is concave downward and has a curvature larger than that of the curved locus therein of the main beam, and an upper attached piece which is concave downward may be provided above each of the deformed segments or a lower attached piece which is straight or concave upward may be provided below each of the deformed segments.

Wherein the specific frame structure of the long strip skeleton has two sub beams which are parallel to each other in the same horizontally curved surface, each of the plurality of hanging hooks is connected to the main beam or the lower attached piece of the main beam fixedly, and has two legs which protrude downward from the main beam or the lower attached piece of the main beam, the sub beams over their substantially entire length together with tips of the legs are embedded in channels on both left and right sides in the rubber strip, the sub beams are hung up by the two legs of each of the hanging hooks and the rubber strip is lifted up by the sub beams, and the connection of the main beam to the upper attached piece or the lower attached piece can be achieved by a welding joint, a riveting joint, a clip clamping joint, or a rivet-sliding slot joint with a limited sliding range.

Wherein when lower attached pieces are provided below the middle portion of the main beam, the hanging hooks of the middle portion are attached to each of the lower attached pieces.

Wherein when the middle portion of the main beam is provided with the upper attached pieces, the connector and one of the upper attached pieces are joined together to form a composite member, that is, said one of the upper attached pieces is formed by causing a base plate of the connector to extend leftward and rightward into extension portions, and the extension portions of the composite member may be straight or concave downward or concave upward.

Wherein one or two or three lower attached pieces having a bending elasticity which are straight or concave upward are provided below the middle portion of the main beam, when the number of the lower attached pieces is two or three, these lower attached pieces are separate or connected together, and one end and the other end of each of the lower attached pieces come into contact with and are connected to a lower surface of the main beam or one of said one end and the other end of one lower attached piece comes into contact with and is connected to a surface of another lower attached piece.

Wherein the lower attached pieces are divided into three attached pieces of one left attached piece, one middle attached piece and one right attached piece, both ends of the middle attached piece, a left end of the left attached piece and a right end of the right attached piece come into contact with and are connected to a lower surface of the main beam, and a right end of the left attached piece comes into contact with and is connected to a portion of the middle attached piece close to a left end of the middle attached piece and a left end of the right attached piece comes into contact with and is connected to a portion of the middle attached piece close to a right end of the middle attached piece.

Wherein the number of the notches formed on each side of the main beam is 1~6 or more, a width i.e. a cutting depth of each of the notches is 6%~30% of the width of the main beam, a total length of respective notches on each side of the main beam is 5%~30% of the entire length of the main beam. and the angle formed by a notch line of each of the notches with respect to a longitudinal axis of the main beam is 0°~30°.

Wherein the middle portion of the main beam deviates from the curved locus therein of the main beam, and is provided with one or two or three deformed segments which are integrated with the main beam and are concave upward, and upper attached pieces which are straight or concave downward or concave upward are provided above the deformed segments, and one end and the other end of each of the upper attached pieces come into contact with and are connected to the main beam or the deformed segments.

Wherein the middle portion of the main beam deviates from the curved locus therein of the main beam, and is provided with one or two or three deformed segments which are integrated with the main beam and are substantially straight, and upper attached pieces which are straight or concave downward are provided above the deformed segments or lower attached pieces which are straight or concave upward are provided below the deformed segments, and one end and the other end of each of the upper attached pieces or the lower attached pieces come into contact with and are connected to the main beam or the deformed segments.

Wherein the middle portion of the main beam deviates from the curved locus therein of the main beam, and is provided with one deformed segment which is integrated with the main beam and is substantially straight, and an upper attached piece which is concave downward is provided above the deformed segment, and the upper attached piece has a curvature greater than or equal to that of the curved locus therein of the main beam.

Wherein the composite member formed by joining the connector and the upper attached piece together is provided above the deformed segment, and the extension portions of the composite member are concave downward.

Wherein the middle portion of the main beam deviates from the curved locus therein of the main beam, and is provided with one or two or three deformed segments which are integrated with the main beam and are concave downward, and each of the deformed segments has a curvature larger than that of the curved locus therein of the main beam, and upper attached pieces which are concave downward are provided above the deformed segments or lower attached pieces which are straight or concave upward are provided below the deformed segments, and one end and the other end of each of the upper attached pieces or each of the lower attached pieces come into contact with and are connected to the main beam or the deformed segments.

Wherein in the case that the middle portion of the main beam deviates from the curved locus therein of the main beam and has the deformed segments integrated with the main beam, the whole main beam is formed by a plurality of portions which are connected to each other at positions where there is an abrupt change of curvature, and the number of the portions is obtained by adding 2 to the number of the deformed segments, two ends of the portions to be connected are fabricated into finger like shapes which can be interlaid, are inserted one into another and then are welded, and by subsequent necessary heat treatment and finishing processes, the elastic main beam will be completed.

The present invention also provides a method for manufacturing a wiper blade, a long strip skeleton of the wiper blade including one main beam and a body of the main beam having a curved locus which is concave downward, a middle portion of the main beam being provided with one to five deformed segments which are integrated with the main beam but deviates from the curved locus therein of the main beam and which are straight or concave downward or concave upward, comprising:

(1) preparing long strip metal sheets with the desired width, thickness and elasticity;

(2) rolling the long strip metal sheets into desired curvatures according to actual requirements or remaining a straight shape of the metal sheets as required;

(3) cutting the long strip metal sheets into portions of desired lengths;

(4) punching two ends of the portions to be connected into finger like shapes which can be interlaid;

(5) inserting the finger like ends one into another and welding them together; and (6) performing necessary heat treatment and finishing processes.

BRIEF DESCRIPTION OF THE DRAWINGS

FIGS. 7A, 7B, 8A and 8B are schematic structural diagrams of a frame type long strip skeleton according to a fourth embodiment of the present invention.

FIG. 9 is a schematic structural diagram of a frame type long strip skeleton according to a fifth embodiment of the present invention.

FIGS. 10A and 10B are schematic diagrams illustrating one of methods for manufacturing a main beam according to the second to the fourth embodiments of the present invention.

DETAILED DESCRIPTION OF THE PREFERRED EMBODIMENTS

Figure 1:
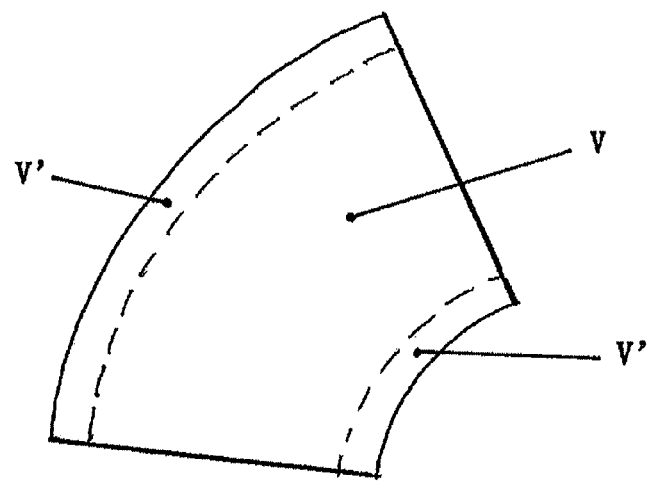
FIG. 1 is a schematic diagram for generally discussing performance of a wiper blade.
Figure 2A:
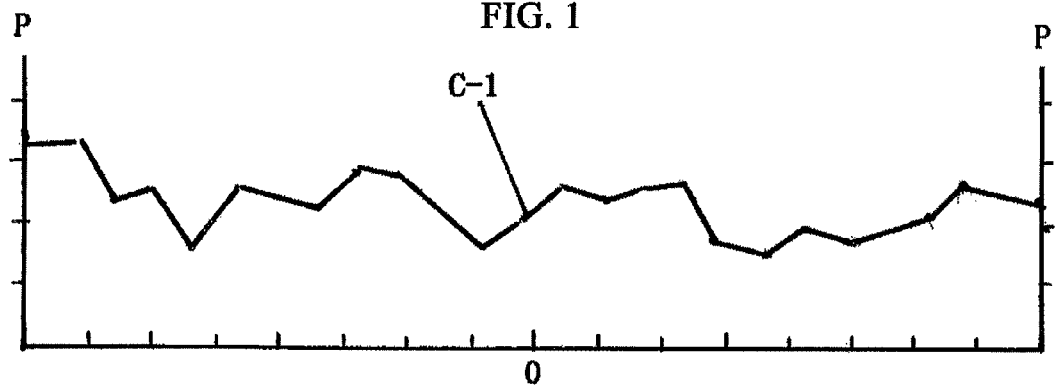
FIGS. 2A and 2B are schematic diagrams for generally exemplifying distribution of pressure applied to a windshield glass by the wiper blade.
Figure 2B:
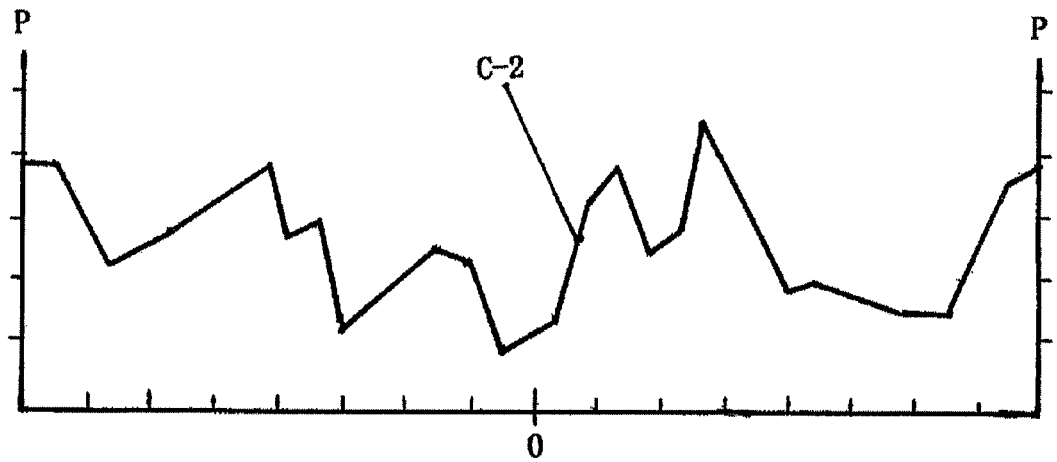

In the present invention, it is noted that:

1) The middle portion (region) mentioned hereinafter of the wiper blade or the frame type long strip skeleton means a region near to a center of an entire length of the wiper blade or a region near to the connector used to be connected to a wiper arm of an automobile. The range of the middle portion is defined by extending toward both ends of the wiper blade from the center thereof by a distance equal to 10%~35% of the entire length of the wiper blade respectively and alters depending on different situations. The both end portions refer to two regions other than the middle portion which are more distant from the center of the wiper blade.

2) The wordings "above the wiper blade or the frame type long strip skeleton" mean to be on a side away from the windshield glass in a using state of the wiper blade, and the term "below" means to be on a side toward the windshield glass in the same state.

3) In a free state (in a case without external force), the main beam mentioned hereinafter has a curved locus in which a specific smoothly continuous curve is concave downward. The two end portions of the main beam will register with said curved locus. In different cases, the middle portion of the main beam may register with said curved locus or may deviate from said curved locus. The specific curve refers to a certain basic mathematic curve such as a circle, an ellipse, a sine curve, a tangent curve, a parabola, a hyperbola, an exponent curve and a log curve or the like. If the curved locus is formed by two different curves connected together, the two curves should be continuous smoothly.

4) When the main beam registers with said curved locus over its entire length, the body of the main beam means the main beam itself with the entire length; and when the main beam registers with said curved locus on the both end portions thereof and deviates from said curved locus in the middle portion thereof, the body of the main beam means the both end portions themselves and a curved locus of the main beam in the middle portion.

5) In the drawings, curvatures of most of the curves which are concave upward or downward are drawn exaggeratedly so that the characteristic tendency of these curvatures can be seen clearly, however, the actual curvatures are generally not so large.

Figure 3A:
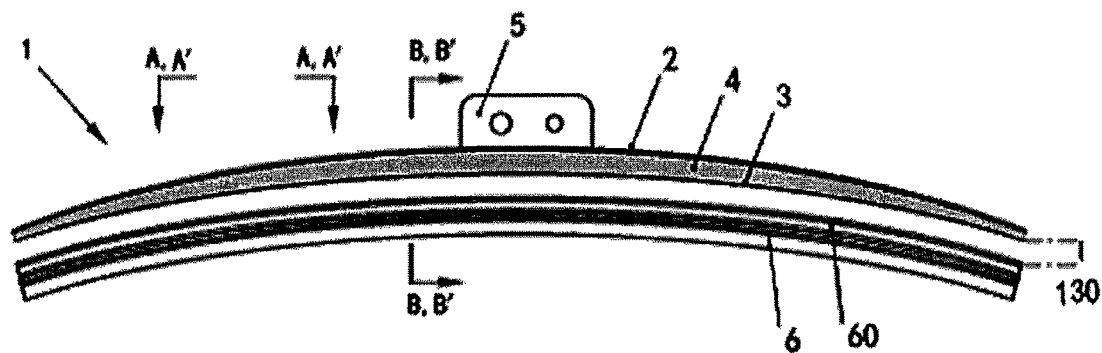
FIGS. 3A to 3P (specifically, FIGS. 3A, 3B, 3C, 3D, 3E, 3F, 3G, 3H, 3I, 3J, 3K, 3L, 3M, 3N and 3P) are schematic structural diagrams of a wiper blade of the present invention.

FIG. 3A shows the wiper blade of the present invention. The wiper blade includes a frame type long strip skeleton 1 and a rubber strip 6 as well as a connector 5 which is located on a middle portion of the long strip skeleton 1 so as to be connected to a wiper arm of an automobile. The wiper blade is formed by attaching the rubber strip 6 to the long strip skeleton 1. Here, for the purpose of clear illustration, the rubber strip 6 is drawn separately, and a dot and dash line 130 is used to indicate that the rubber strip 6 is ought to be attached on the long strip skeleton 1 originally. The long strip skeleton 1 includes an elastic main beam 2 and an elastic sub beam 3 located below the main beam 2, both of which are approximately parallel to each other. There is a region 4 (painted gray in FIG. 3A) between the main beam 2 and the sub beam 3, which represents a specific frame structure configured according to each of embodiments of the present invention and will be described in detail later.

Here, the region 4 designates a basic feature of the invention, i.e. a frame structure directly constituted by the main beam itself and the sub beam or a frame structure constituted by the main beam which has been modified and the sub beam. The frame structure may also be attached with a certain structure selected from the followings in which (1) the middle portion of the main beam is attached with a number of lower or upper attached pieces to become the modified main beam, and said frame structure is formed by the modified main beam and the sub beam together; (2) notches for adjusting bending property of the main beam are provided on both sides of the main beam (and a deformed segment modified from the middle portion of the main beam), and said frame structure is formed by the main beam provided with the notches and the elastic sub beam together; (3) the middle portion of the main beam is modified into a number of deformed segments which are integral with the main beam but deviate from the curved locus therein of the main beam, with or without lower or upper attached pieces attached, to become the modified main beam, and said frame structure is formed by the modified main beam and the sub beam together; and (4) the middle portion of the main beam is not modified, lower and upper attached pieces are not used, and said frame structure is formed only by the main beam itself and the sub beam while a distance between them at different positions varies.

Figure 3B:
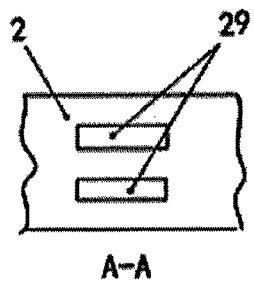
Figure 3C:
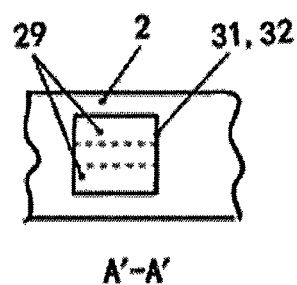
Figure 3D:
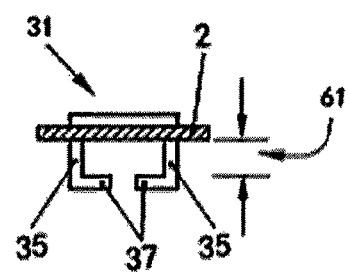
Figure 3E:
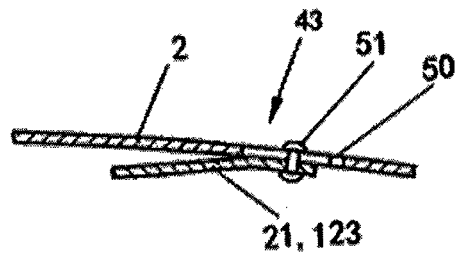
Figure 3G:
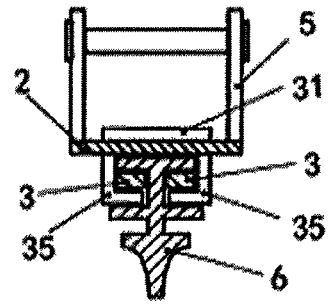
Figure 3F:
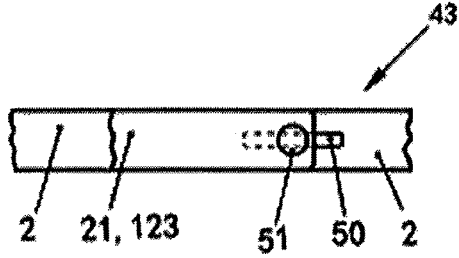
Figure 3H:
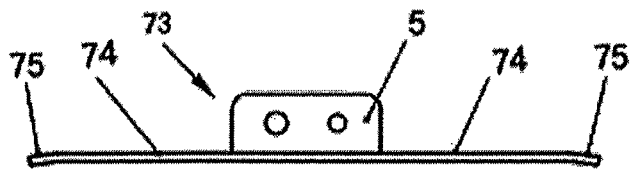
Figure 3I:
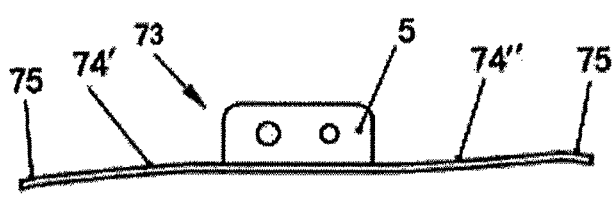
Figure 3J:
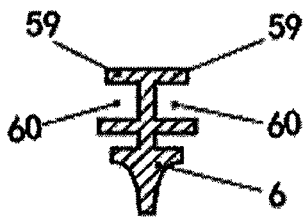

As shown in FIG. 3J, channels 60 are provided in the rubber strip 6. After installed, the sub beam 3 is embedded over its substantially entire length in the channels 60 of the rubber strip 6 and hangs (or lifts) the rubber strip 6 up.

Normally, a whole wiper blade further includes end caps located on both ends of the long strip skeleton 1 and wind deflectors located above the long strip skeleton 1 (generally one on the left and another on the right, and sometimes one end cap and one wind deflector are fabricated into a piece and one such piece is mounted on each of the left and right), which belongs to the prior art, and these components are not shown in the drawings.

The frame type long strip skeleton is made to be in an arched shape, and a curvature of the arched shape is generally greater than a curvature of the windshield glass of the automobile. In use, since the wiper arm applies pressure downward such that an arched concave surface of the wiper blade is pressed toward the windshield glass, the rubber strip comes into contact with the windshield glass. Due to reaction force of the windshield glass, the wiper blade is lifted up from both ends thereof and is decreased in its curvature until the curvature of the wiper blade as a whole is in proximity to that of the windshield glass and the rubber strip comes into contact over its entire length with the windshield glass so that rainwater on the glass can be wiped off.

The bending elasticity of the frame type long strip skeleton, specifically distribution of the bending elasticity along the length of the long strip skeleton, particularly the bending elasticity distribution extending to different positions toward the both end portions from the middle portion in the case that the middle portion is pressed toward the windshield glass, plays a very important role for wiping effect of the wiper blade. Uniform distribution of bending elasticity may cause the pressure to be distributed evenly. In the present invention, various frame structures in the region 4 between the main beam and the sub beam are designed so that the downward pressure received by the connector 5 located on the middle portion of the wiper blade can be evenly distributed over the entire length of the rubber strip, thus the object of the invention can be attained.

FIG. 3B is an A-A view in FIG. 3A, and shows that a pair of holes 29 are provided at plural positions in the main beam 2 so that two legs of a hanging hook 31 or 32 for hanging the sub beam 3 protrude downward therefrom. FIG. 3C is an A'-A' view in FIG. 3A, and shows that the two legs of the hanging hook 31 or 32 pass through the holes 29 and may be fixed thereto by means of a welding process usually. It can be seen from the followed drawings that the hanging hook 31 or 32 is not attached to the main beam but is attached to a lower attached piece of the main beam when there are lower attached pieces located below the middle portion of the main beam. In addition, the hanging hook 31 or 32 may be connected and fixed to the main beam or the lower attached piece in other non-welding manner, for example, it is fixed by a riveting process or fastened by dimensional exact fitting to an appropriate position.

In FIG. 3D, it is shown in a longitudinal direction of the long strip skeleton that the hanging hook 31 has been hung on the main beam 2 and two legs 35 of the hanging hook 31 protrude downward below the main beam 2, making ready for tips 37 of the legs 35 to hang up the sub beams 3 (at the same time, the sub beams 3 lift up the rubber strip 6). When the hanging hook 31 is manufactured, as required, it is made to have different heights 61 (usually 3~5 heights) so as to accommodate to the different distances between the main beam 2 and the sub beam 3 at different positions. FIG. 3N shows a structure similar to that in FIG. 3D, in which the hanging hook 32 is hung on the main beam 2. Two legs 35' of the hanging hook 32 together with tips 37 thereof protrude downward below the main beam 2, and a spacing groove 36 on each of the legs 35' is provided above a groove for receiving the sub beam. When the spacing groove 36 is manufactured, as required, it is made to have different heights (usually 3~5 heights) so as to adjust and control the distance between the main beam 2 and the sub beam 3.

FIG. 3G is a B-B sectional view in FIG. 3A and shows one section of the wiper blade of the present invention. In this figure, sections of the long strip skeleton 1 and the rubber strip 6 as well as the connector 5 (connected to the main beam 2) on the middle portion of the long strip skeleton are shown. It can be seen from FIG. 3G that the two legs 35 of the hanging hook 31 being used hang up two sub beams 3 and one rubber strip 6 together. FIG. 3P is a B'-B' sectional view in FIG. 3A. FIG. 3P shows a structure similar to that in FIG. 3G, in which the hanging hook 32 is hung on the main beam 2 and the two legs 35' of the hanging hook 32 hang up two sub beams 3 and one rubber strip 6 together, and in which the spacing groove 36 for adjusting and controlling the distance between the main beam 2 and the sub beam 3 is provided on each of the two legs 35'.

FIGS. 3E and 3F (FIG. 3F is a bottom view of FIG. 3E) show a rivet-sliding slot joint 43 with a limited sliding range collectively. A sliding slot 50 is formed in the main beam 2 at a position where a lower attached piece 21 or 123 (or an upper attached piece) is connected to the main beam 2, a hole is formed in the attached piece, and a rivet 51 passes through the hole and the sliding slot 50 so that the attached piece is connected to the main beam and also has a sliding range restricted by the sliding slot 50. Thus, the elastic distribution of the frame type long strip skeleton, i.e. the pressure distribution of the wiper blade is adjusted.

FIG. 3H shows a composite member 73 formed by joining the connector 5 and an upper attached piece together. The composite member 73 has functions of the connector 5 and the upper attached piece concurrently, and is formed by causing a base plate of the connector 5 to extend leftward and rightward into extension portions 74 respectively. In this figure, the extension portions 74 are straight horizontally. End portions 75 of the composite member 73 are bent into an arched shape so as to match with and connect to the curved main beam.

FIG. 3I shows that the extension portions 74 may also be fabricated into an arched shape 74' concave downward and an arched shape 74" concave upward for accommodating to different configures respectively.

FIG. 3J shows a cross section of the rubber strip 6 individually. A pair of channels 60 are provided on both left and right sides in an upper portion of the rubber strip 6, and the tips 37 of the legs 35 or 35' along with a pair of sub beams 3 are embedded in the channels 60 so that the sub beams 3 are hung up by the tips 37 of the hanging hook 31 or 32. Then, the sub beams 3 lift up the topmost left and right side flaps 59 of the rubber strip 6 and realize hanging and fixation of the rubber strip 6.

Figure 3K:
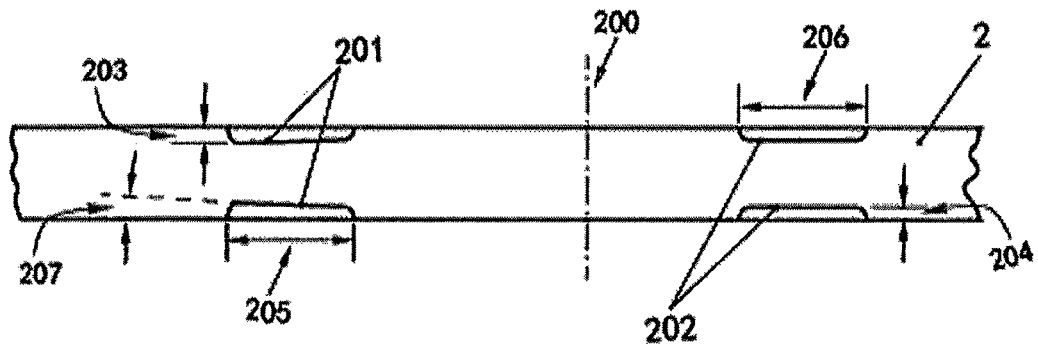

FIG. 3K shows a notch 201 or 202 fabricated in side edges of the main beam 2. A longitudinal cutting line (i.e. notch line) of the notch may be a straight line (202) parallel to a longitudinal axis of the main beam 2 or an oblique line (201) forming an angle 207 with respect to the longitudinal axis of the main beam 2. The longitudinal cutting line (notch line) of the notch may also be an arched line or a linear or broken-line (not shown). A numeral 200 denotes a center point of the main beam 2. The notch 201 has a cutting length 205 and a cutting width (depth) 203, and the longitudinal cutting line (notch line) of the notch 201 is oblique and forms the angle 207 with respect to the longitudinal axis of the main beam 2. The notch 202 has a cutting length 206 and a cutting width 204, and the longitudinal cutting line of the notch 202 is parallel to the longitudinal axis of the main beam 2. The number of the notches formed on each side of the main beam is 1~6 or more. The cutting depth (width) of each notch is 6%~30% of a width of the main beam. A total length of respective notches on each side of the main beam is 5%~30% of the entire length of the main beam. The angle 207 formed by the notch line (longitudinal cutting line) of each notch with respect to the longitudinal axis of the main beam is 0°~30°. The notches fabricated in the side edges of the main beam may change the elasticity distribution of the main beam so that the frame type long strip skeleton can meet the using requirement prescribed.

Figure 3L:
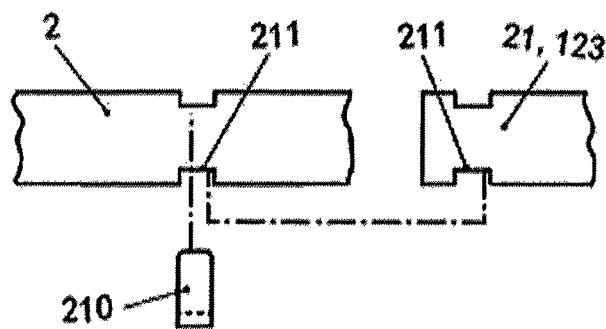
Figure 3M:
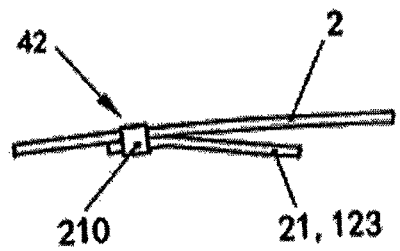
Figure 3N:
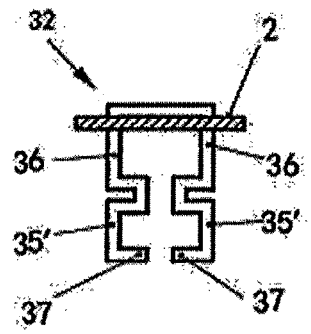
Figure 3P:
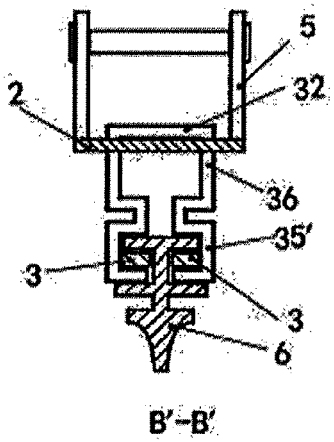

FIGS. 3L and 3M (FIG. 3L is a bottom view of FIG. 3M) show a clip clamping joint 42 for the main beam and an attached piece. A small notch 211 is formed at the corresponding positions of the main beam 2 and the lower attached piece 21 or 123 (or an upper attached piece). After the small notches in the main beam 2 and the lower or upper attached piece 21 or 123 are aligned with each other, a clip 210 envelops the notches 211 and is tightened.

A basic configuration of the wiper blade of the present invention has been described with reference to FIGS. 3A to 3P hereinbefore. The region 4 which indicates a frame structure between the main beam 2 and the sub beam 3 will be described below in connection with the following embodiments.

First Embodiment

Figure 4A:
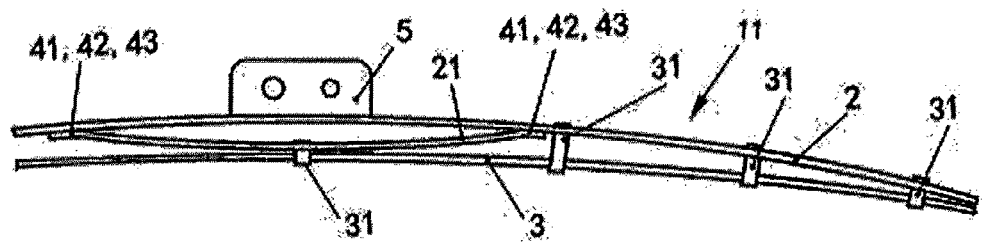
FIGS. 4A, 4B, 4C, 4D and 4E are schematic structural diagrams of a frame type long strip skeleton according to a first embodiment of the present invention.

FIG. 4A is a side view of a frame type long strip skeleton 11 and shows a basic form of the first embodiment of the present invention. Since the long strip skeleton 11 is a structure that is symmetrical bilaterally, a left end portion thereof and a right end portion thereof are the same totally. As a result, the left end portion is omitted and only a middle portion and the right end portion of the long strip skeleton 11 can be seen in this figure. Some drawings followed are drawn in the same way. In FIG. 4A, a middle portion of an elastic main beam 2 registers with a predetermined curved locus. A numeral 21 denotes a lower attached piece below the main beam 2. Similar to the main beam 2, the lower attached piece 21 is made of an elastic metal sheet into an arched shape but has a surface that is concave upward, and the concave surface of the lower attached piece 21 is opposed to that of the main beam 2 with a distance between them. In fact, the curvatures of the main beam 2 and the lower attached piece 21 are not so great that a distance as large as that drawn exaggeratedly for clear illustration in FIG. 4A is formed between them, and the same applies to the followed drawings. Numerals 41, 42 and 43 denote various joints used to connect and fix the lower attached piece 21 to the main beam 2 at positions where they are brought into contact, specifically, the numeral 41 denotes a welding joint, the numeral 42 denotes a clip clamping joint (shown in FIGS. 3L and 3M), and the numeral 43 denotes a rivet-sliding slot joint with a limited sliding range (shown in FIGS. 3E and 3F). The hanging hooks 31 are hung on the main beam 2 and fixed thereto, and a pair of legs protruding downward of each of the hanging hooks 31 hang up the pair of sub beams 3 which are parallel to each other in the same horizontal surface with the tips 37. At the locations where the sub beams 3 are just below the lower attached piece 21, a hanging hook 31 is attached to the lower attached piece 21 rather than the main beam 2, and the same applies to the followed drawings. In FIG. 4A and the followed drawings, at each of the hanging hooks 31, an appropriate distance is left between the sub beams 3 and the main beam 2 or the lower attached piece 21 in the corresponding positions as a reserved space making ready for the side flaps 59 in the upper portion of the rubber strip 6 to be embedded in to hang up the rubber strip 6.

The lower attached piece 21 attached below the middle portion of the main beam 2 may change the elastic distribution of the main beam so as to change the elastic distribution of the whole long strip skeleton. In concrete designing, the most suitable condition under which the optimum elastic distribution of the whole long strip skeleton can be found by adjusting the length, the width, the thickness, the arched curvature and (the elasticity of) the material of the lower attached piece 21. Thus, the optimum pressure distribution of the long strip skeleton along its entire length is caused and the object of the present invention can be attained.

Figure 4B:
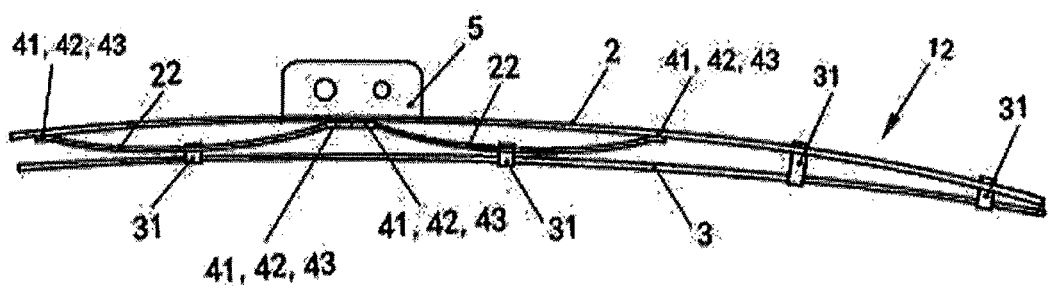

FIG. 4B shows another form of the long strip skeleton according to the first embodiment of the invention. A lower attached piece 22 divided into two arched segments concave upward is attached below the middle portion of the main beam 2 of the long strip skeleton 12 so as to adjust the elastic distribution of the long strip skeleton flexibly. The structure shown in FIG. 4B is similar to that shown in FIG. 4A and will not be described repeatedly.

Figure 4C:
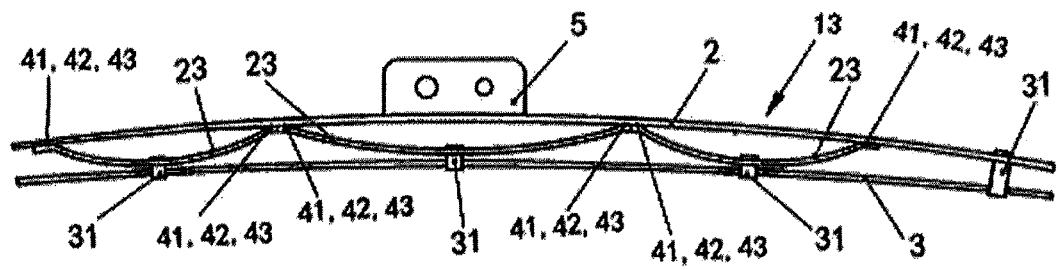

FIG. 4C shows still another form of the long strip skeleton according to the first embodiment of the invention. A lower attached piece 23 divided into three arched segments concave upward is attached below the middle portion of the main beam 2 of the long strip skeleton 13 so as to adjust the elastic distribution of the long strip skeleton more flexibly. The structure shown in FIG. 4C is similar to that shown in FIG. 4A or 4B and will not be described repeatedly.

Figure 4D:
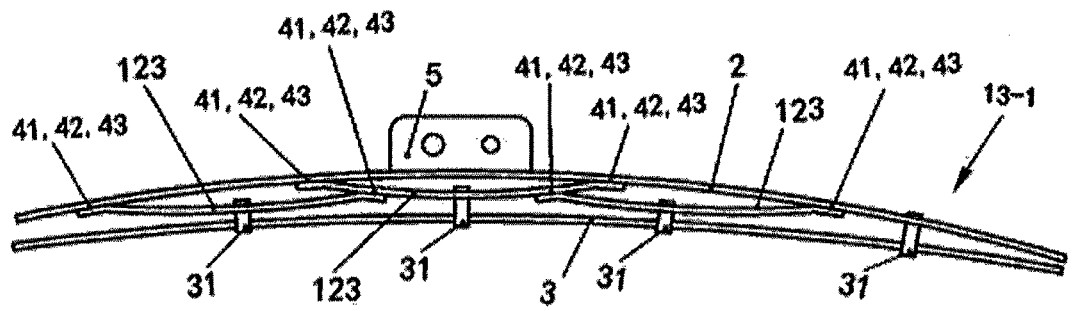

FIG. 4D shows an alternative of the form in FIG. 4C. In FIG. 4D, a long strip skeleton 13-1 is similar to the long strip skeleton 13 in FIG. 4C in that a lower attached piece 123 is divided into three segments of one left segment, one middle segment and one right segment. Both ends of the middle segment are connected to a lower surface of the main beam 2; a left end of the left segment is connected to the lower surface of the main beam 2 while a right end of the left segment is connected to a portion of the middle segment close to a left end of the middle segment; and a right end of the right segment is connected to the lower surface of the main beam 2 while a left end of the right segment is connected to a portion of the middle segment close to a right end of the middle segment. In this way, the main beam 2 is connected to the three lower attached pieces 123 in an overlapping manner to form a unique frame structure.

Figure 4E:
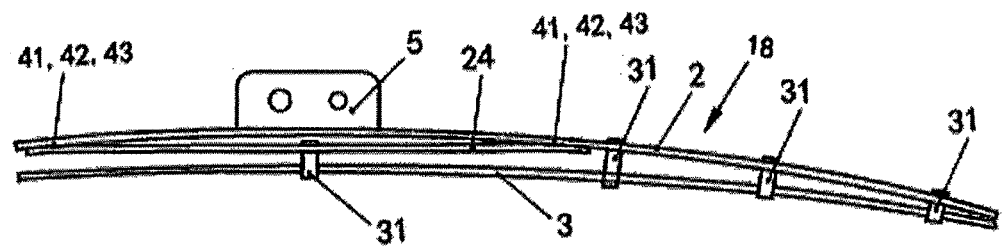

FIG. 4E shows still further another form of the long strip skeleton according to the first embodiment of the invention. A structure of a long strip skeleton 18 in FIG. 4E is similar to that of the long strip skeleton 11 shown in FIG. 4A except that a lower attached piece 24 is attached below the middle portion of the main beam 2. The lower attached piece 24 has a very small curvature and approaches to a straight line. Such structure is special that the lower attached piece 24 is apt to be prepared nevertheless the desired effect may be obtained.

It is also possible that the lower attached piece 24 shown in FIG. 4E is divided into two or three segments as shown in FIGS. 4B and 4C, and this case is not shown in the drawings. Or it is possible that the three segments of the lower attached piece 24 are overlapped like the three segments of the lower attached piece 123 in FIG. 4D, and this case is not shown in the drawings.

The lower attached piece (21, 22, 23, 24, or 123) in the present embodiment can be divided into one or plural segments, generally 5 segments at most, and any number more than 5 will cause inconvenience or diseconomy.

In the first embodiment, the number of the hanging hooks 31 is generally from 4 to 16 depending on the length of the wiper blade and the concrete design and arrangement thereof. The same applies to the second to the fifth embodiments of the invention.

At positions where each of the hanging hooks hangs up the elastic sub beams 3 to bring the tips 37 of the hanging hooks into contact with the sub beams, the hanging hooks and the sub beams 3 can be connected to each other or be slidable relatively without connection; or some hanging hooks are connected to the sub beams while other hanging hooks are remained slidable relative to the sub beams. In this manner, the pressure distribution of the frame structure of the whole wiper blade can be adjusted thereby to attain the object of the invention. The connection can be achieved by welding or other manners. The same applies to the second to the fifth embodiments of the invention.

Second Embodiment

FIGS. 5A, 5B, 5C, 5D, 5E and 5F show frame type long strip skeletons 15, 15-1, 15-2, 15-3, 16 and 17 according to the second embodiment of the present invention respectively.

Figure 5A:
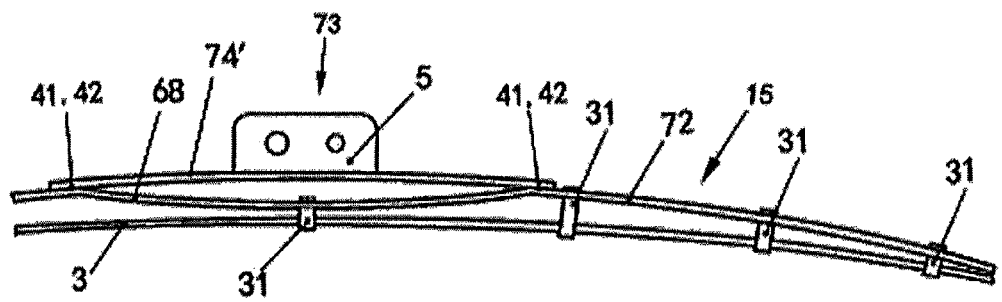
FIGS. 5A, 5B, 5C, 5D, 5E and 5F are schematic structural diagrams of a frame type long strip skeleton according to a second embodiment of the present invention.

FIG. 5A is a side view of the long strip skeleton 15 and shows a basic form of the second embodiment. In FIG. 5A, a numeral 72 denotes an elastic main beam of the long strip skeleton 15, and a middle portion of the main beam 72 does not register with a predetermined curved locus and deviates from said curved locus. The body of the main beam 72 extends into an arched shape which is concave downward, while the middle portion of the main beam 72 is provided with a deformed segment 68 integrated with the body. The long strip skeleton 15 shown in FIG. 5A has one deformed segment 68. Normally, the width, the thickness and the elasticity of the deformed segment 68 are substantially consistent with those of the body (exception may exist), however the curvature of the deformed segment may be the same as or different from that of the body. Particularly, the deformed segment 68 is concave upward in a direction opposite to the direction in which the body is bent so that the main beam 72 exhibits a discontinuous shape having an abrupt change of curvature in the middle portion thereof. In the meanwhile, although the deformed segment 68 is bent downward and sags, in the middle portion of the main beam 72, the composite member 73 formed by joining the connector 5 and an upper attached piece together complements the arched line concave downward into which the body of the main beam 72 extends. The extension portions 74' of the composite member 73 complement the appearance of the main beam 72 into a continuous arched line concave downward. The width, the thickness and the elasticity of the extension portions 74' may be the same as or different from those of the body of the elastic main beam 72. A numeral 41 or 42 denotes two connection points of the extension portions 74' and the main beam 72, and the composite member 73 and the main beam 72 are connected and fixed to each other by means of a welding joint 41 or a clip clamping joint 42. It can be seen that in this embodiment, the composite member 73 formed by joining the connector 5 and an upper attached piece together is then connected to an end of a wiper arm of an automobile (which is similar to what is shown in the drawings followed). Each of the hanging hooks 31 are attached to the body or the deformed segment 68 of the main beam 72 so that the two sub beams 3 and the rubber strip 6 are hung up simultaneously (which is similar to what is shown in the drawings followed).

Due to effects of the deformed segment 68 having the abrupt change of curvature in the middle portion of the main beam 72 as well as the two extension portions 74' and the connector 5 which are joined together, the elastic distribution of the whole long strip skeleton is varied. In concrete designing, the most suitable condition under which the elastic distribution of the whole long strip skeleton is optimum can be found by adjusting the length and the curvature of the deformed segment 68 as well as the width, the thickness and (the elasticity of) the material of the extension portions 74'. Thus, the optimum pressure distribution of the long strip skeleton along its entire length is caused and the object of the present invention can be attained.

Figure 5B:
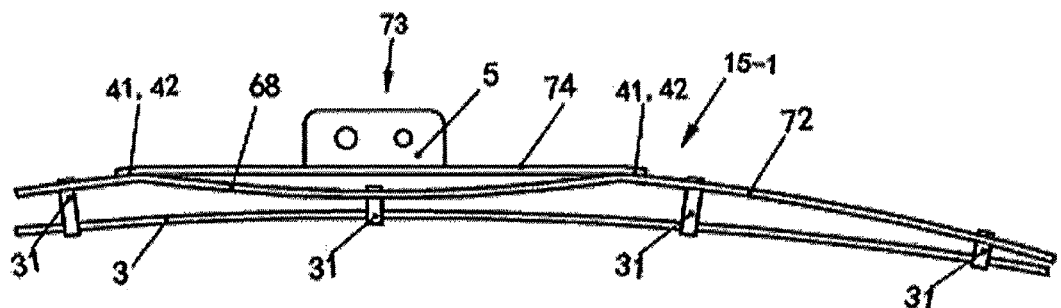

FIG. 5B shows the first of alternatives of the basic form in FIG. 5A. A long strip skeleton 15-1 in FIG. 5B is similar to the long strip skeleton 15 shown in FIG. 5A except that the extension portions 74' in FIG. 5A are concave downward while the extension portions 74 in FIG. 5B are substantially straight.

Figure 5C:
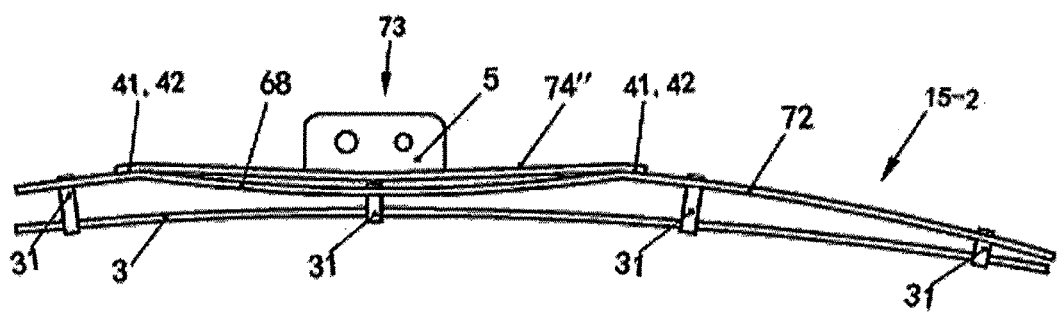

FIG. 5C shows the second of the alternatives of the basic form in FIG. 5A. A long strip skeleton 15-2 in FIG. 5C is similar to the long strip skeleton 15 shown in FIG. 5A or the long strip skeleton 15-1 shown in FIG. 5B except that the extension portions are modified into the extension portions 74" concave upward. Obviously, the curvature of the extension portions 74" can not be larger than that of the deformed segment 68 which is concave upward likewise, otherwise this configuration will not be accomplished.

Figure 5D:
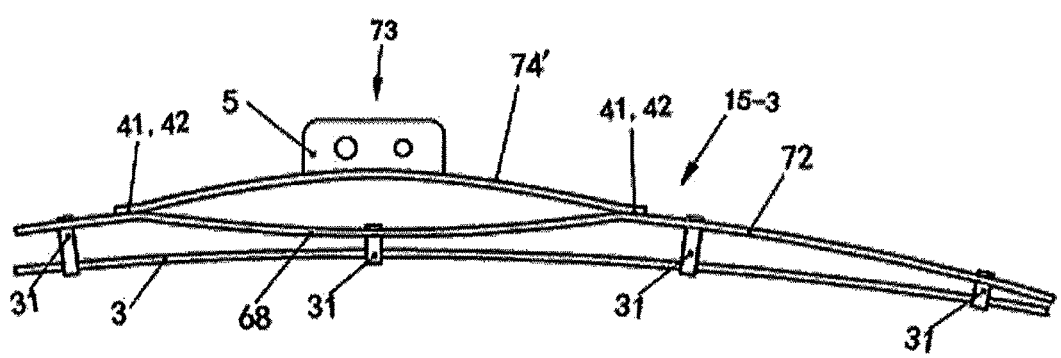

FIG. 5D shows the third of the alternatives of the basic form in FIG. 5A. A long strip skeleton 15-3 in FIG. 5D is similar to the long strip skeleton 15 shown in FIG. 5A or the long strip skeleton 15-1 shown in FIG. 5B or the long strip skeleton 15-2 shown in FIG. 5C except that the extension portions 74' concave downward have a curvature larger than (or equal to or somewhat smaller than, not shown in the drawings) that of the curved locus therein of the main beam 72. When the curvature of the extension portions 74' is equal to that of the curved locus therein of the main beam 72, the long strip skeleton 15-3 will be entirely the same as the long strip skeleton 15 shown in FIG. 5A.

Figure 5E:
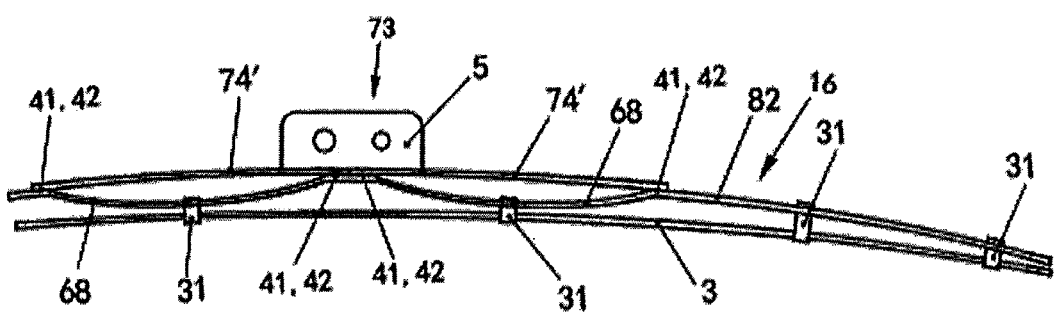

FIG. 5E shows another form of the long strip skeleton according to the second embodiment of the invention. A long strip skeleton 16 in FIG. 5E is similar to the long strip skeleton 15 shown in FIG. 5A except that a middle portion of an elastic main beam 82 of the long strip skeleton 16 has two deformed segments 68, that is, the main beam 82 is provided with two deformed segments 68 concave upward having an abrupt change of curvature but the body of the main beam extends into an arched shape which is concave downward. Above the two deformed segments 68 concave upward is provided the composite member 73 which is formed by joining the connector 5 and an upper attached piece together and which overlays the deformed segments 68. The extension portions 74' here need to be made a little bit longer to go beyond the two deformed segments 68 so that the appearance of the elastic main beam 82 becomes a continuous arched line concave downward. A numeral 41 or 42 denotes connection points of the extension portions 74' and the main beam 82 or the deformed segments thereof, and the composite member 73 and the main beam 82 are connected and fixed to each other by means of a welding joint 41 or a clip clamping joint 42.

Figure 5F:
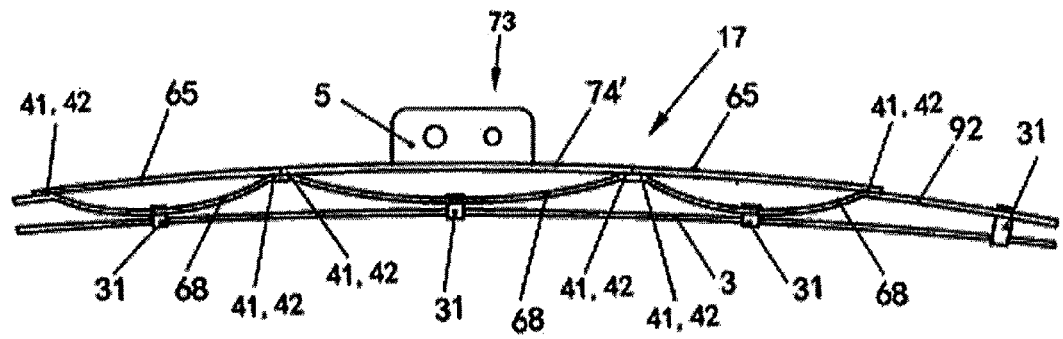

FIG. 5F shows still another form of the long strip skeleton according to the second embodiment of the invention. A long strip skeleton 17 in FIG. 5F is similar to the long strip skeleton 15 shown in FIG. 5A or the long strip skeleton 16 shown in FIG. 5E except that a middle portion of an elastic main beam 92 of the long strip skeleton 17 has three deformed segments 68, that is, the main beam 92 is provided with three deformed segments 68 concave upward having an abrupt change of curvature but the body of the main beam extends into an arched shape which is concave downward. Above the central one of the three deformed segments 68 concave upward is provided the composite member 73 which is formed by joining the connector 5 and an upper attached piece together and which overlays the central deformed segment 68, and above the left one and the right one of the three deformed segments 68 are provided upper attached pieces 65 which overlay these two deformed segments 68 so that the appearance of the main beam 92 becomes a continuous arched line concave downward.

Regarding the case shown in FIGS. 5E and 5F in which the main beam of the long strip skeleton has two or three deformed segments, with reference to the manner in FIG. 5B or 5C or 5D, it is possible that the composite member 73 which is formed by joining the connector 5 and an upper attached piece together and has the extension portions 74 in a straight shape or has the extension portions 74" concave upward or has the extension portions 74' concave downward is provided above the respective deformed segments 68 (these variations are not shown in the drawings)

The number of the deformed segment 68 in the present embodiment may be one or more, generally 5 at most, and any number more than 5 will cause inconvenience or diseconomy.

Third Embodiment

Figure 6A:
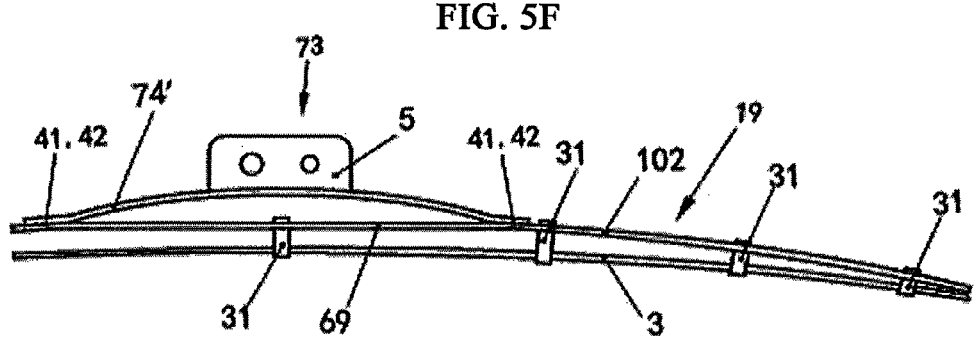
FIGS. 6A, 6B and 6C are schematic structural diagrams of a frame type long strip skeleton according to a third embodiment of the present invention.

FIG. 6A shows a frame type long strip skeleton 19 according to the third embodiment of the present invention. The long strip skeleton 19 in FIG. 6A is similar to the long strip skeleton 15 shown in FIG. 5A except that a middle portion of a main beam 102 of the long strip skeleton 19 is provided with one deformed segment 69 having a very small curvature and approaching to a straight line. In FIG. 6A, the extension portions 74' concave downward of the composite member 73 which is formed by joining the connector 5 and an upper attached piece together have a curvature larger than that of the curved locus therein of the main beam 102. However, it is also possible that the curvature of the extension portions 74' is equal to or in proximity to that of the curved locus therein of the main beam 102, which is not shown here. Such structure is special that the deformed segment 69 is apt to be prepared nevertheless the is desired effect may be obtained.

Figure 6B:
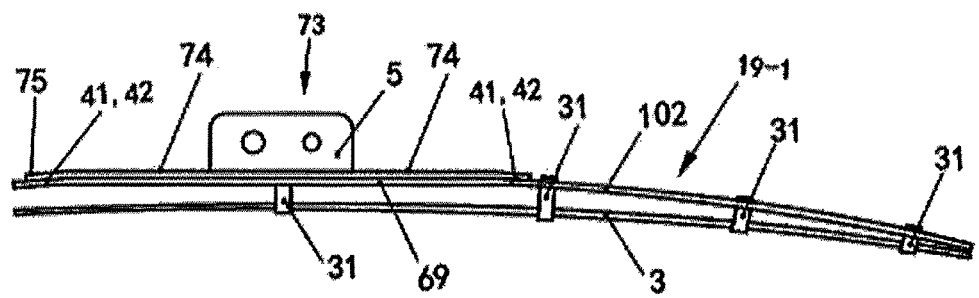

FIG. 6B shows another form of the frame type long strip skeleton according to the third embodiment of the present invention. A long strip skeleton 19-1 in FIG. 6B is similar to the long strip skeleton 19 shown in FIG. 6A except that the extension portions 74 of the composite member 73 formed by joining the connector 5 and an upper attached piece together approach to a straight line so that the composite member 73 almost keeps close contact with the deformed segment 69.

With reference to the manner in FIG. 6A, it is possible to configure a frame type long strip skeleton which is similar to that in FIG. 5E or 5F but employs two or three straight deformed segments 69, and this case is not shown in the drawings.

In the third embodiment, it is possible that the composite member 73 which is formed by joining the connector 5 and an upper attached piece together is modified by connecting the connector 5 to the straight deformed segment 69 directly, and replacing the upper attached piece (formed by extension portions 74 or 74') with a lower attached piece in a straight shape or an arched shape concave upward but below the straight deformed segment 69, this case is not shown in the drawings. With reference to the manner in FIG. 5E or 5F, it is also possible to configure a frame structure which has two or three straight deformed segments 69 but employs the lower attached piece in the straight shape or the arched shape concave upward, and this case is not shown in the drawings.

Figure 6C:
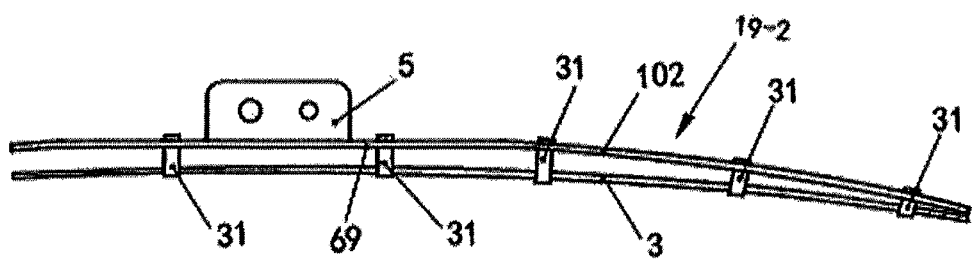

FIG. 6C shows still another form of the frame type long strip skeleton according to the third embodiment of the present invention. In a long strip skeleton 19-2, the middle portion of the main beam 102 is provided with the deformed segment 69 approaching to a straight line and the connector 5 is connected to the straight deformed segment 69 directly without any upper attached piece and lower attached piece. Thus, the frame type long strip skeleton is only constituted by the main beam with the straight deformed segment and the two sub beams below the main beam. This is a simple and feasible structure.

It is possible that the main beam of the long strip skeleton is provided with one or two or three deformed segments (in a straight shape or an arched shape concave upward or an arched shape concave downward) in the manner in FIG. 6C so that the connector 5 is connected to one of the deformed segments directly without any upper attached piece and lower attached piece, and this case is not shown in the drawings.

The number of the deformed segment 69 in the present embodiment may be one or more, generally 5 at most, and any number more than 5 will cause inconvenience or diseconomy.

Fourth Embodiment

Figure 7A:
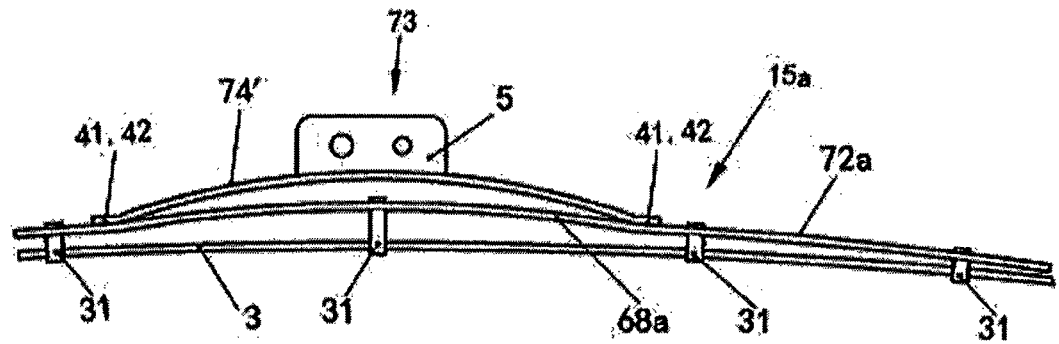

FIG. 7A is a side view of a frame type long strip skeleton 15a and shows a basic form of the fourth embodiment of the present invention. In FIG. 7A, a numeral 72a denotes an elastic main beam of the long strip skeleton 15a. A middle portion of the main beam 72a does not register with a predetermined curved locus and deviates from said curved locus. The body of the main beam 72a extends into an arched shape which is concave downward, while the middle portion of the main beam 72a is provided with a deformed segment 68a integrated with the body. The deformed segment 68a is concave downward as well, but has a curvature larger than that of the curved locus therein of the middle portion of the main beam 72a to produce an abrupt change of curvature. Above the deformed segment 68a is provided the composite member 73 which is formed by joining the connector 5 and an upper attached piece together, and the extension portions 74' of the composite member 73 are concave downward and have a curvature larger than that of the deformed segment 68a. Thus, the frame structure of the invention is constituted by the composite member 73 as well as the main beam 72a and the sub beams 3 below the composite member.

Figure 7B:
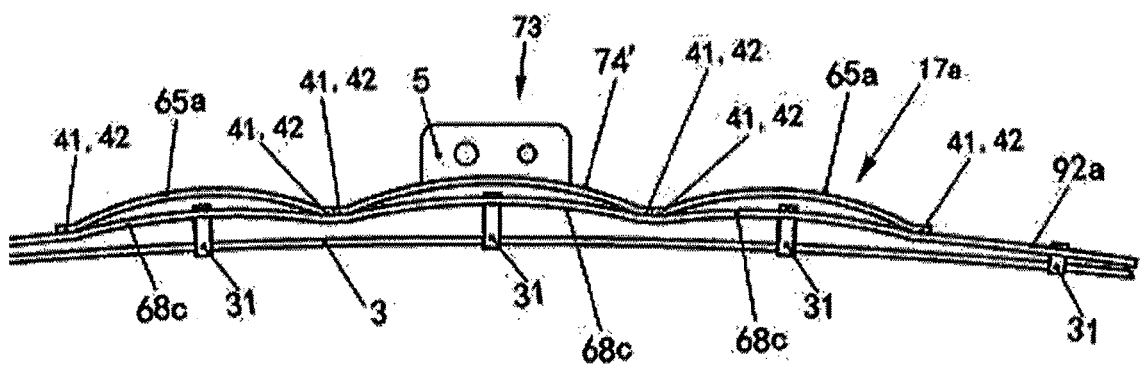

FIG. 7B is a side view of a frame type long strip skeleton 17a and shows Do another form of the fourth embodiment of the present invention. In FIG. 7B, a numeral 92a denotes a main beam of the long strip skeleton 17a. A middle portion of the main beam 92a does not register with a predetermined curved locus and deviates from said curved locus. Three deformed segments 68c which are concave downward are provided in the middle portion of the main beam 92a, and each of the deformed segments 68c has a curvature larger than that of the curved locus therein of the middle portion of the main beam 92a to produce an abrupt change of curvature. Above the central deformed segment 68c is provided the composite member 73 which is formed by joining the connector 5 and an upper attached piece together, and the extension portions 74' of the composite member 73 are concave downward and have a curvature larger than that of the central deformed segment 68c. Above the left one and the right one of the three deformed segments 68c are provided upper attached pieces 65a, and the upper attached pieces 65a are concave downward as well and have a curvature larger than that of the left and the right deformed segments 68c. Thus, the frame structure of the invention is configured.

With reference to FIGS. 7A and 7B, it is also possible that a similar frame structure has two deformed segments and two upper attached pieces, and this case is not shown in the drawings.

Figure 8A:
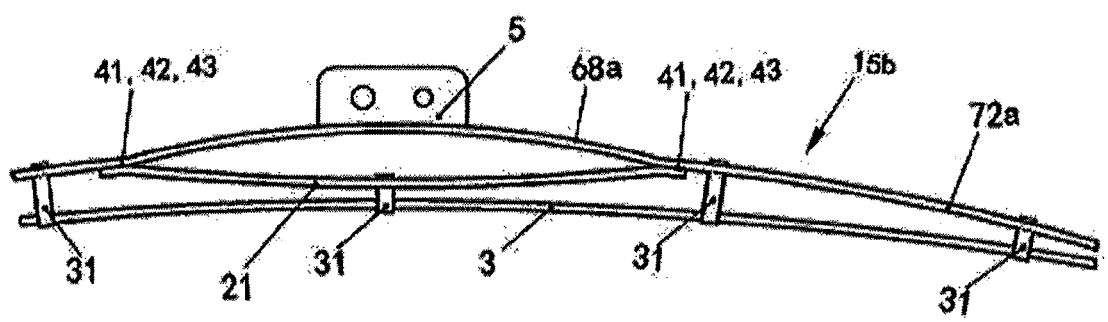

FIG. 8A is a side view of a frame type long strip skeleton 15b and shows still another form of the fourth embodiment of the present invention. The long strip skeleton 15b shown in FIG. 8A is similar to the long strip skeleton 15a shown in FIG. 7A except that the composite member 73 which is formed by joining the connector 5 and an upper attached piece together is modified by connecting the connector 5 to the deformed segment 68a directly and replacing the extension portions 74' concave downward with a lower attached piece 21 which is concave upward and below the deformed segment 68a. It can be seen that the lower attached piece 21 concave upward may be modified into a straight shape or an arched shape concave downward slightly, and this case is not shown in the drawings.

FIG. 8B is a side view of a frame type long strip skeleton 17b and shows still further another form of the fourth embodiment of the present invention. The long strip skeleton 17b shown in FIG. 8B is similar to the long strip skeleton 17a shown in FIG. 7B except that the upper attached pieces 65a and the extension portions 74' which are concave downward in the long strip skeleton 17a are changed to lower attached pieces 23 which are concave upward but below the deformed segments 68c and the connector 5 is provided on the central deformed segment 68c directly. It can be seen that the lower attached pieces 23 concave upward may be modified into a straight shape or an arched shape concave downward slightly, and this case is not shown in the drawings.

With reference to FIGS. 8A and 8B, it is also possible that a similar frame structure has two deformed segments and two lower attached pieces, and this case is not shown in the drawings.

Fifth Embodiment

FIG. 9 shows a frame type long strip skeleton 14 according to the fifth embodiment of the present invention. In FIG. 9, a middle portion of a main beam 2 registers with a predetermined curved locus. Without using the upper and lower attached pieces, the long strip skeleton in the present embodiment uses the hanging hooks 32 to adjust the distance between the main beam 2 and the sub beams 3. The hanging hooks 32 used in the embodiment are as shown in FIGS. 3N and 3P. The spacing grooves 36 of the hanging hooks 32 have different sizes (heights), for example, the hanging hooks 32 having the spacing grooves with larger heights may be used in the middle portion of the main beam, the hanging hooks 32 having the spacing grooves with smaller heights may be used at positions nearer to both ends of the main beam 2, and the hanging hooks without the spacing grooves, i.e. the hanging hooks 31 may be used at positions nearest to both ends of the main beam 2. Thus, the distance between the main beam 2 and the sub beams 3 can be made larger in the middle portion of the main beam (namely, the middle portion of the frame type long strip skeleton or the middle portion of the whole wiper blade) and gets smaller gradually toward both ends of the main beam 2 so that the effect of the frame structure can be achieved and the basic feature of the invention can be implemented. It is a matter of course that the distance between the main beam 2 and the sub beams 3 can be adjusted in an alternative manner, which is not shown in the drawings.

In the present embodiment, at positions where each of the hanging hooks hangs up the sub beams 3 to bring the tips 37 of the hanging hooks into contact with the sub beams, the hanging hooks and the sub beams may be fixed together or a portion of the hanging hooks are required to be fixed to the sub beams so as to cause the frame structure formed between the main beam 2 and the sub beams 3 to be stronger. Thus, the optimum pressure distribution of the long strip skeleton along the entire length thereof can be achieved by adjusting the elastic distribution thereof thereby to attain the object of the invention.

In the above embodiments, as shown in FIG. 3K, notches in an arched shape or a linear or broken-line shape can be fabricated on both sides of the main beam (2, 72, 72a, 82, 92, 92a or 102) or the deformed segment (68, 68a, 68c or 69) modified in the main beam. Thus, the elastic distribution of the frame type long strip skeleton can be adjusted further thereby to attain the object of the invention.

In the second, the third and the fourth embodiments of the present invention, since the deformed segment 68, 68a, 68c or 69 is provided in the middle portion of the elastic main beam 72 (or 72a, 82, 92, 92a, 102), the main beam has an abrupt change of curvature at two or more positions. The main beam can be manufactured in the following two manners. The first one is an integral rolling method, that is, a whole of long strip metal sheet is rolled into a shape in which both end portions register with a predetermined curved locus and a middle portion is formed into the deformed segment. The second one is a manufacturing method provided by the present invention in which a plurality of portions are connected together as one piece by welding at every position where there is the abrupt change of curvature, as shown in FIGS. 10A and 10B.

In FIG. 10A, ends 61 and 62 of two pieces 2a and 2b to be connected are fabricated (punched) into finger like ends (or zigzag ends) which can be interlaid tightly, then are inserted one into another as shown by the two opposite arrows in FIG. 10A. As shown in FIG. 10B, after inserted, the ends 61 and 62 become a firm joint 63 by welding. By subsequent necessary heat treatment and finishing processes, the elastic main beam 72 (or 72a, 82, 92, 92a, 102) will be completed.

The invention claimed is:

1. A wiper blade comprising:
   a frame type long strip skeleton for supporting the wiper blade;
   a connector which is provided on a middle portion of the long strip skeleton so as to be connected to a wiper arm of an automobile; and
   a rubber strip supported or hung by the long strip skeleton,
   the long strip skeleton is in an arched shape and has a bending elasticity,
   in use, a concave surface of the wiper blade is pressed toward a windshield glass of the automobile,
   since the wiper arm applies pressure downward, the rubber strip comes into contact with the windshield glass, and
   due to reaction force of the windshield glass, the wiper blade is changed in its curvature and the rubber strip comes into contact over its entire length with the windshield glass so that rainwater on the glass can be wiped off,
   wherein
   the long strip skeleton includes one elastic main beam and two elastic sub beams which are located below the main beam and are horizontally parallel to each other and approximately parallel to the main beam,
   in a free state, a body of the main beam has a curved locus in which a specific smoothly continuous curve is concave downward, both end portions of the main beam register with said curved locus and a middle portion of the main beam deviates from said curved locus,
   a plurality of hanging hooks which are provided to the main beam connect the sub beams to the main beam to form the long strip skeleton,
   the rubber strip is supported or hung by the sub beams, and
   the middle portion of the main beam of the long strip skeleton is fabricated into one to three concave-upwardly deformed segments which are integrated with the main beam but deviate from the curved locus therein of the main beam, or the middle portion of the main beam of the long strip skeleton is fabricated into one to three substantially straight deformed segments which are integrated with the main beam but deviate from the curved locus therein of the main beam, or the middle portion of the main beam of the long strip skeleton is fabricated into one to three concave-downwardly deformed segments which have a curvature larger than that of the curved locus therein of the main beam and which are integrated with the main beam but deviate from the curved locus therein of the main beam.

2. The wiper blade according to claim 1, wherein each of the plurality of hanging hooks is connected to the main beam fixedly, and has two legs which protrude downward from the main beam, the sub beams over their substantially entire length together with tips of the legs of the hanging hooks are embedded in channels on both left and right sides in the rubber strip, and the sub beams are hung up by the two legs of each of the hanging hooks and the rubber strip is lifted up by the sub beams.

3. The wiper blade according to claim 2, wherein upper attached pieces which are straight or concave downward or concave upward are provided above the concave-upwardly deformed segments.

4. The wiper blade according to claim 3, wherein the connection of the main beam to the upper attached pieces is achieved by a welding joint, a riveting joint, a clip clamping joint, or a rivet-sliding slot joint with a limited sliding range.

5. The wiper blade according to claim 2, wherein upper attached pieces which are straight or concave downward are provided above the substantially straight deformed segments or lower attached pieces which are straight or concave upward are provided below the substantially straight deformed segments.

6. The wiper blade according to claim 5, wherein the connection of the main beam to the upper attached pieces or lower attached pieces is achieved by a welding joint, a riveting joint, a clip clamping joint, or a rivet-sliding slot joint with a limited sliding range.

7. The wiper blade according to claim 5, wherein the middle portion of the main beam is provided with one deformed segment which is integrated with the main beam and is substantially straight, and an upper attached piece which is concave downward is provided above the deformed segment.

8. The wiper blade according to claim 2, wherein upper attached pieces which are concave downward are provided above the concave-downwardly deformed segments or lower attached pieces which are straight or concave upward are provided below the concave-downwardly deformed segments.

9. The wiper blade according to claim 8, wherein the connection of the main beam to the upper attached pieces or lower attached pieces is achieved by a welding joint, a riveting joint, a clip clamping joint, or a rivet-sliding slot joint with a limited sliding range.

10. The wiper blade according to claim 2, wherein when the middle portion of the main beam is provided with upper attached pieces, the connector and one of the upper attached pieces are joined together to form a composite member, that is, said one of the upper attached pieces is formed by causing a base plate of the connector to extend leftward and rightward into extension portions, and the extension portions of the composite member are straight or concave downward or concave upward.

11. The wiper blade according to claim 10, wherein the extension portions of the composite member are concave downward.

12. The wiper blade according to claim 1, wherein notches for adjusting a bending property of the main beam are provided on both sides of the main beam.

13. The wiper blade according to claim 12, wherein the number of the notches formed on each side of the main beam is 1~6, a width, a cutting depth, of each of the notches is 6%~30% of the width of the main beam, and a total length of respective notches on each side of the main beam is 5%~30% of the entire length of the main beam.

14. The wiper blade according to claim 1, wherein the main beam is formed by a plurality of portions with one or two or three deformed segments as its middle portions, said portions are connected to each other at positions where there is an abrupt change of curvature, and the number of the portions is obtained by adding 2 to the number of the deformed segments, two ends of the portions to be connected are fabricated into zigzag shapes which can be interlaid, are inserted one into another and then are welded, and by subsequent necessary heat treatment and finishing processes, the elastic main beam will be completed.

15. A method for manufacturing a wiper blade, a long strip skeleton of the wiper blade including one main beam and a body of the main beam having a curved locus which is concave downward, a middle portion of the main beam being provided with one to three deformed segments which are integrated with the main beam but deviate from the curved locus therein of the main beam and which are straight or concave downward or concave upward, comprising:

(1) preparing long strip metal sheets with a desired width, thickness, and elasticity;

(2) rolling the long strip metal sheets into desired curvatures according to actual requirements or remaining a straight shape of the metal sheets as required;

(3) cutting the long strip metal sheets into portions of desired lengths;

(4) punching two ends of the portions to be connected into zigzag shapes which can be interlaid;

(5) inserting the zigzag ends one into another and welding them together; and (6) performing necessary heat treatment and finishing processes.

* * * * *